United States Patent
Paul et al.

(10) Patent No.: US 8,881,258 B2
(45) Date of Patent: Nov. 4, 2014

(54) SYSTEM, METHOD, AND COMPUTER PROGRAM FOR PREVENTING INFECTIONS FROM SPREADING IN A NETWORK ENVIRONMENT USING DYNAMIC APPLICATION OF A FIREWALL POLICY

(75) Inventors: Manabendra Paul, Karnataka (IN); Praveen Ravichandran Sudharma, Karnataka (IN)

(73) Assignee: McAfee, Inc., Santa Clara, CA (US)

( * ) Notice: Subject to any disclaimer, the term of this patent is extended or adjusted under 35 U.S.C. 154(b) by 30 days.

(21) Appl. No.: 13/216,516

(22) Filed: Aug. 24, 2011

(65) Prior Publication Data

US 2013/0247167 A1 Sep. 19, 2013

(51) Int. Cl.
G06F 17/00 (2006.01)
G06F 11/00 (2006.01)
H04L 29/06 (2006.01)

(52) U.S. Cl.
CPC .............. *H04L 63/145* (2013.01); *H04L 63/20* (2013.01)
USPC ................................... 726/11; 726/1; 726/22

(58) Field of Classification Search
CPC ..... H04L 12/585; H04L 51/12; H04L 63/145; H04L 63/20; H04L 63/14; H04L 63/0263; G06F 21/577
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,349,338 B1 * | 2/2002 | Seamons et al. | 709/229 |
| 6,460,050 B1 | 10/2002 | Pace et al. | |
| 7,093,287 B1 | 8/2006 | Gusler et al. | |
| 7,181,769 B1 * | 2/2007 | Keanini et al. | 726/23 |
| 7,490,353 B2 * | 2/2009 | Kohavi | 726/22 |
| 7,506,155 B1 | 3/2009 | Stewart et al. | |
| 7,751,620 B1 * | 7/2010 | Cosoi | 382/168 |
| 7,814,535 B1 * | 10/2010 | Barile et al. | 726/5 |
| 7,886,339 B2 * | 2/2011 | Keohane et al. | 726/3 |
| 8,068,479 B2 * | 11/2011 | Martin et al. | 370/351 |
| 8,621,552 B1 * | 12/2013 | Lotem et al. | 726/1 |
| 2002/0133477 A1 * | 9/2002 | Abel | 707/1 |
| 2004/0128545 A1 | 7/2004 | Chakravarty | |
| 2004/0193709 A1 * | 9/2004 | Selvaggi et al. | 709/224 |
| 2004/0255157 A1 * | 12/2004 | Ghanea-Hercock | 713/201 |
| 2005/0138413 A1 * | 6/2005 | Lippmann et al. | 713/201 |
| 2005/0149481 A1 * | 7/2005 | Hesselink et al. | 707/1 |

(Continued)

OTHER PUBLICATIONS

Al-Shaer, "Conflict Classification and Analysis of Distributed Firewall Policies", IEEE Journal on Selected Areas in Communications, vol. 23, No. 10, Oct. 2005, pp. 2069-2084.*

(Continued)

*Primary Examiner* — Andrew Nalven
*Assistant Examiner* — Walter Malinowski
(74) *Attorney, Agent, or Firm* — Patent Capital Group

(57) ABSTRACT

A method for containing a threat in network environment using dynamic firewall policies is provided. In one example embodiment, the method can include detecting a threat originating from a first node having a source address in a network, applying a local firewall policy to block connections with the source address, and broadcasting an alert to a second node in the network. In more particular embodiments, an alert may be sent to a network administrator identifying the source address and providing remedial information. In yet other particular embodiments, the method may also include applying a remote firewall policy to the first node blocking outgoing connections from the first node.

14 Claims, 3 Drawing Sheets

(56) References Cited

U.S. PATENT DOCUMENTS

| | | | |
|---|---|---|---|
| 2005/0188217 A1* | 8/2005 | Ghanea-Hercock | 713/200 |
| 2005/0201297 A1* | 9/2005 | Peikari | 370/242 |
| 2005/0286522 A1* | 12/2005 | Paddon et al. | 370/389 |
| 2006/0020814 A1* | 1/2006 | Lieblich et al. | 713/182 |
| 2006/0161979 A1* | 7/2006 | Pandey et al. | 726/22 |
| 2006/0195896 A1* | 8/2006 | Fulp et al. | 726/11 |
| 2006/0282887 A1* | 12/2006 | Trumper et al. | 726/11 |
| 2007/0006304 A1* | 1/2007 | Kramer et al. | 726/22 |
| 2007/0083617 A1* | 4/2007 | Chakrabarti et al. | 709/218 |
| 2007/0204154 A1* | 8/2007 | Swander et al. | 713/166 |
| 2008/0005124 A1* | 1/2008 | Jung et al. | 707/10 |
| 2008/0072278 A1* | 3/2008 | Cohen et al. | 726/1 |
| 2008/0256618 A1* | 10/2008 | Bansal et al. | 726/11 |
| 2008/0263503 A1* | 10/2008 | Polly et al. | 717/100 |
| 2008/0282314 A1* | 11/2008 | Abzarian et al. | 726/1 |
| 2008/0320130 A1* | 12/2008 | Nagaraja et al. | 709/224 |
| 2009/0019518 A1* | 1/2009 | Lee | 726/1 |
| 2009/0083727 A1* | 3/2009 | Fu et al. | 717/172 |
| 2009/0187968 A1* | 7/2009 | Roese et al. | 726/1 |
| 2009/0249470 A1* | 10/2009 | Litvin et al. | 726/13 |
| 2009/0300632 A1* | 12/2009 | Falcon et al. | 718/103 |
| 2009/0300760 A1* | 12/2009 | Chitor et al. | 726/22 |
| 2009/0303931 A1* | 12/2009 | Yamauchi | 370/328 |
| 2010/0142378 A1* | 6/2010 | Matheney et al. | 370/241 |
| 2010/0154060 A1* | 6/2010 | Demblewski | 726/24 |
| 2010/0211658 A1 | 8/2010 | Hoogerwerf et al. | |
| 2011/0047381 A1* | 2/2011 | Ganesan et al. | 713/169 |
| 2011/0055921 A1* | 3/2011 | Narayanaswamy et al. | 726/22 |
| 2011/0225624 A1* | 9/2011 | Sawhney et al. | 726/1 |
| 2012/0110665 A1* | 5/2012 | Abdul et al. | 726/23 |
| 2012/0216267 A1* | 8/2012 | Austel et al. | 726/8 |
| 2013/0166703 A1* | 6/2013 | Hammer et al. | 709/220 |
| 2013/0247167 A1* | 9/2013 | Paul et al. | 726/11 |

OTHER PUBLICATIONS

Broom, "Security consolidation and optimisation: Gaining the most from your IT assets", Computer Fraud & Security, May 2009, pp. 15-17.*

Dawoud, "Infrastructure as a Service Security: Challenges and Solutions", IDS Enterprise Panel, Aug. 2008, 8 pages.*

Huang, "MobiCloud: Building Secure Cloud Framework for Mobile Computing and Communication", 2010 Fifth IEEE International Symposium on Service Oriented System Engineering, IEEE computer society, 2010, pp. 27-34.*

Hwang, "Trusted Cloud Computing with Secure Resources and Data Coloring", IEEE Internet Computing, 2010, pp. 14-22.*

Hyun Jung La, "A Conceptual Framework for Provisioning Context-Aware Mobile Cloud Services", 2010 IEEE 3rd International Conference on Cloud Computing, 2010, IEEE computer society, pp. 466-473.*

Schaffer, "X as a Service, Cloud Computing, and the Need for Good Judgment", IT Pro, Sep./Oct. 2009, IEEE, pp. 4-5.*

"Security-as-a-Service", McAfee, Inc., 2003 [available online at URL <http://www.mcafee.com/us/products/security-as-a-service/index.aspx>], downloaded and printed Aug. 24, 2011 (2 pages).

McAfee SaaS Endpoint Protection 5.2.0, Product Guide, copyright 2010 McAfee, Inc., [available online at URL https://kc.mcafee.com/resources/sites/MCAFEE/content/live/PRODUCT_DOCUMENTATION/22000/PD22864/en_US/SaaS%20Endpoint%20Protection%205.2%20Product%20Guide.pdf], downloaded and printed Aug. 24, 2011 (191 pages).

* cited by examiner

SYSTEM, METHOD, AND COMPUTER PROGRAM FOR PREVENTING INFECTIONS FROM SPREADING IN A NETWORK ENVIRONMENT USING DYNAMIC APPLICATION OF A FIREWALL POLICY

TECHNICAL FIELD

This specification relates in general to the field of information technology security, and more particularly, to a system, method, and computer program for preventing an infection from spreading in a network environment using dynamic application of a firewall policy.

BACKGROUND

The field of network security has become increasingly important in today's society. The Internet has enabled interconnection of different computer networks all over the world. However, the Internet has also presented many opportunities for malicious operators to exploit these networks. Once malicious software has infected a host computer, it can perform any number of malicious actions, such as sending out spam or malicious emails from the host computer, stealing sensitive information from a business or individual associated with the host computer, propagating to other host computers, and/or assisting with distributed denial of service attacks. In addition, for some types of malware, a malicious operator can sell or otherwise give access to other malicious operators, thereby escalating the exploitation of the host computers. Thus, the ability to effectively protect and maintain stable computers and systems continues to present significant challenges for component manufacturers, system designers, and network operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment that can include detecting a threat originating from a first node having a source address in a network, applying a local firewall policy to block connections with the source address, and broadcasting an alert to a second node in the network. In more particular embodiments, an alert may be sent to a network administrator identifying the source address and providing remedial information.

In yet other particular embodiments, the method may also include applying a remote firewall policy to the first node blocking outgoing connections from the first node.

Example Embodiments

Figure 1:
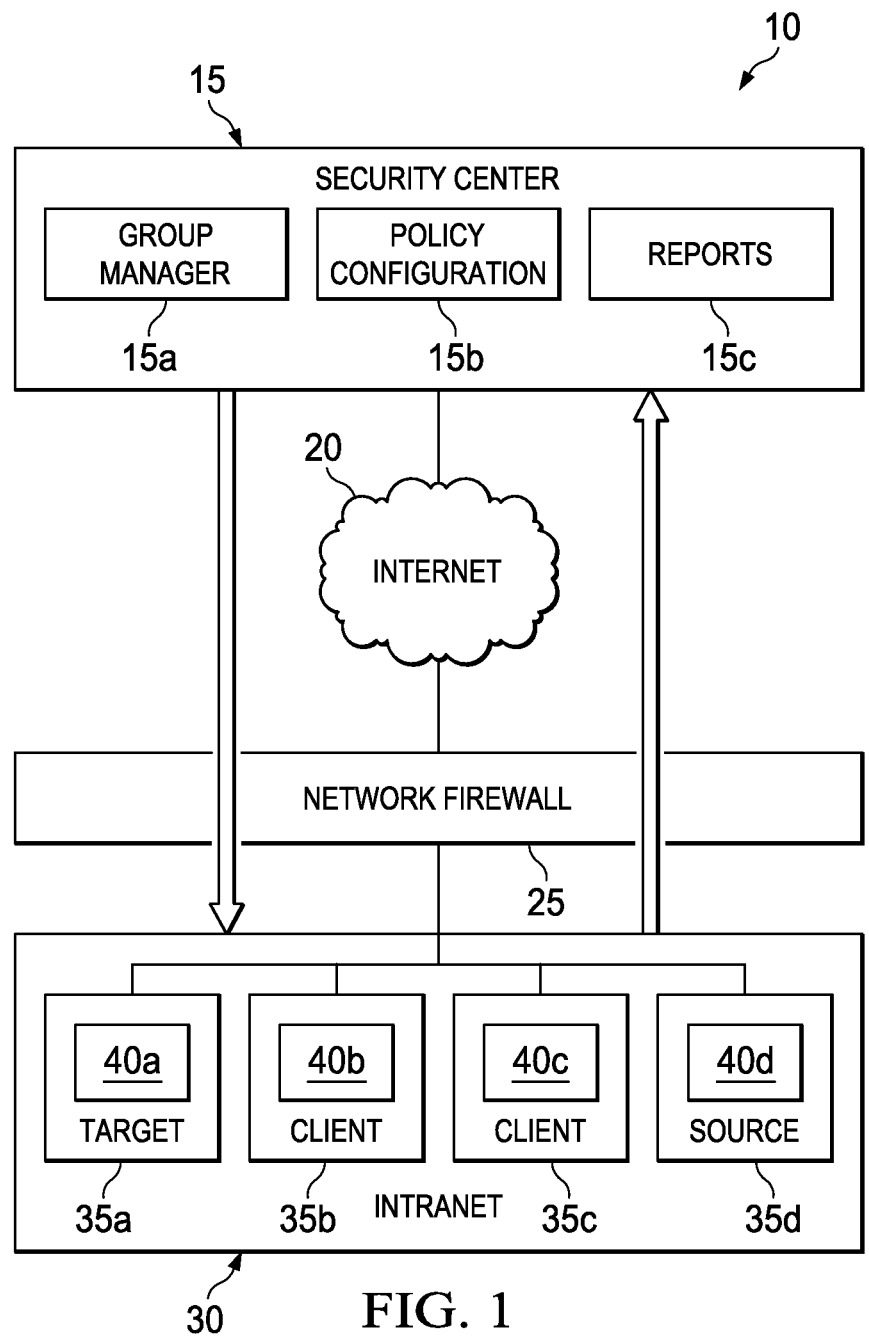
FIG. 1 is a simplified block diagram illustrating an example embodiment of a network environment for preventing an infection from spreading using dynamic application of a firewall policy in accordance with this specification.

Turning to FIG. 1, FIG. 1 is a simplified block diagram of an example embodiment of a network environment 10 in which a dynamic firewall policy can prevent an infection from spreading. In the embodiment illustrated in FIG. 1, network environment 10 can include a security center 15, Internet 20, a network firewall 25, an intranet 30, and clients 35a-35d. An intranet, such as intranet 30, is typically a private network shielded from unauthorized external access. Firewall 25, for example, may control communications between clients 35a-35d in intranet 30 and other network nodes attached to Internet 20, such as by blocking unauthorized communication while permitting authorized communications. Thus, in this example embodiment, clients 35a-35d may communicate with other nodes attached to Internet 20 by establishing a connection through firewall 25 if permitted by policies implemented in firewall 25.

In general, clients 35a-35d represent any type of node in a network environment, including but not limited to a desktop computer, a server, a laptop, a mobile telephone, network element, or any other type of device that can receive or establish a connection with another node. Moreover, client 35a is designated as a "target" machine and client 35d is designated as a "source" machine to reflect an example scenario in which client 35d may be infected with malware that is attempting to spread or replicate to client 35a. Such a designation does not imply any limitations on the arrangement or number of clients 35a-35d in network environment 10 which may be infected or targeted, though. Each of clients 35a-35d may also include a dynamic policy module 40a-40d in one example embodiment of network environment 10.

Security center 15 in example network environment 10 represents a security-as-a-service (SaaS) infrastructure, which may include additional utility modules, such as a group manager module 15a, a policy configuration module 15b, and a report module 15c. Thus, security center 15 may exchange data (such as malware signatures, protection status, detection data, etc.) with clients 35a-35d to facilitate security services.

Each of the elements of FIG. 1 may couple to one another through simple network interfaces or through any other suitable connection (wired or wireless), which provides a viable pathway for network communications. Additionally, any one or more of these elements may be combined or removed from the architecture based on particular configuration needs. Network environment 10 may include a configuration capable of transmission control protocol/Internet protocol (TCP/IP) communications for the transmission or reception of packets in a network. Network environment 10 may also operate in conjunction with a user datagram protocol/IP (UDP/IP) or any other suitable protocol where appropriate and based on particular needs.

For purposes of illustrating the techniques for providing network security in example embodiments, it is important to understand the activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments used in organizations and by individuals include the ability to communicate electronically with other networks using the Internet, for example, to access web pages hosted on servers connected to the Internet, to send or receive electronic mail (i.e., email) messages, or to exchange files. Malicious users are continuously developing new tactics for using the Internet to spread malware and to gain access to confidential information. Malware generally includes any software designed to access and/or control a computer without the informed consent of the computer owner, and is most commonly used as a label for any hostile, intrusive, or annoying software such as a computer virus, bot, spyware, adware, etc. Once compromised, malware may subvert a host and use it for malicious activity, such as spamming or information theft. Malware also typically includes one or more propagation vectors that enable it to spread within an organization's network or across other networks to other organizations or individuals. Common propagation vectors include exploiting known vulnerabilities on nodes within the local network and sending malicious emails having a malicious program attached or providing malicious links within the emails.

A firewall is generally designed to permit or deny network transmissions based upon a set of rules, and is frequently used to protect networks from unauthorized access while permitting legitimate communications to pass. Thus, a network firewall can prevent unknown programs and processes from accessing nodes behind the firewall, protecting against infection (e.g., malware) from outside a network and limiting the activity of any malicious software that is present by blocking incoming or outgoing requests on certain TCP/IP ports. Similarly, a local node in a network may include a local firewall that can permit or deny transmissions to and from other nodes based upon a set of rules applicable to the local node. However, a firewall does not generally attempt to identify or remove any programs or other data.

Antivirus software is generally used to prevent, detect, and remove malware, including but not limited to computer viruses, worms, trojan horses, spyware and adware. A variety of strategies are typically employed. For example, signature-based detection involves searching for known patterns of data within executable code. However, it is possible for a computer to be infected with new malware for which no signature is yet known, and heuristics can also be used to counter these types of threats. One type of heuristic approach, generic signatures, can identify new viruses or variants of existing viruses by looking for known malicious code, or slight variations of such code, in files. Some antivirus software can also predict what a file will do by running it in a sandbox and analyzing what it does to see if it performs any malicious actions.

SaaS platforms continue to evolve as a solution for many security requirements, particularly for small and medium-sized organizations. An SaaS suite can provide endpoint, email, web, and network protection through a cloud infrastructure, guarding against malware (e.g., viruses, adware attacks, network intrusion, URL filtering, etc.). Such an integrated suite can leverage other core systems, such as antivirus and firewall systems.

Many SaaS platforms provide a "cloud" infrastructure, which can provide computation, software, data access, and storage services that do not require end-user knowledge of the physical location and configuration of the system that delivers the services. A cloud-computing infrastructure can consist of services delivered through shared data-centers, which may appear as a single point of access. Multiple cloud components can communicate with each other over loose coupling mechanisms, such as a messaging queue. Thus, the processing (and the related data) is not in a specified, known or static location, and a lightweight software agent may be installed on a local node while offloading the majority of data analysis to a provider's infrastructure.

One approach to implementing cloud antivirus involves scanning suspicious files using multiple antivirus engines. Parallel scanning of files using potentially incompatible antivirus scanners can be achieved by spawning a virtual machine per detection engine and therefore eliminating any possible issues. Cloud antivirus can also perform "retrospective detection," whereby the cloud detection engine rescans all files in its file access history when a new threat is identified thus improving new threat detection speed. Cloud antivirus may also be advantageous for effective virus scanning on devices that lack the computing power to perform the scans themselves.

Usually, a customer may install an SaaS suite in combination with antivirus and firewall modules on local nodes. Antivirus modules can detect an IP address of a source machine (also referred to herein as a 'source address') from which malware is attempting to copy itself onto other machines in a network, and firewall products can have a policy for blocking connections (both incoming and outgoing) from an IP address. However, firewall modules generally may not be able to block the malware from spreading to other machines in a network or be able to inform other SaaS clients in the same network to avoid being infected. Instead, a reactive approach is typically employed for each machine in a network environment. For example, after a machine in a network environment has been infected with malware, security solutions may not prevent the malware from propagating to other machines in the network. Once the malware has been copied to another machine, however, an antivirus module may detect the malware signature and take appropriate remedial steps to remove, quarantine, or otherwise stop the malware from running on the other machine. Thus, proactively preventing an infection from spreading to other machines in a network presents significant challenges.

In accordance with embodiments described herein, an SaaS agent can substantially reduce or eliminate the threat of an infection spreading in a network environment using dynamic application of firewall policies. For example, when malware is attempting to replicate from a source machine to a target machine where an SaaS agent is running, the SaaS agent can detect the malware and prevent infection of the target machine. The SaaS agent may also identify the IP address of the source machine and take additional actions to prevent the malware from spreading to other clients in the network.

For example, an SaaS agent on a target machine can create a local firewall policy to block all incoming and outgoing connections from/to the identified source IP address in the network. The SaaS agent can also broadcast a message to other SaaS clients on the same network to apply the newly created firewall policy. Thus, all SaaS clients in the same network could know that the source machine may be infected with malware that is attempting to crawl in the current network and spread the infection. Because the firewall policy is broadcast and enforced in the other machines, incoming/outgoing network requests from/to the source machine can be blocked and hence the spread of the virus could be immediately curbed. Moreover, in other example embodiments, an SaaS agent on the target machine can also look for the presence of an SaaS firewall on the source machine and, if present, then it can apply a distant firewall policy to ban all outgoing connections from the source machine to all other machines in the network. In addition, the distant firewall policy could potentially ban any or all incoming connections from other nodes to the source machine. An appropriate notification, such as a detailed email, identifying the source IP address, infection type and recently added policy may also be sent to alert a network administrator. The notification can also describe the steps for quarantining and/or cleaning the source machine.

Figure 2:
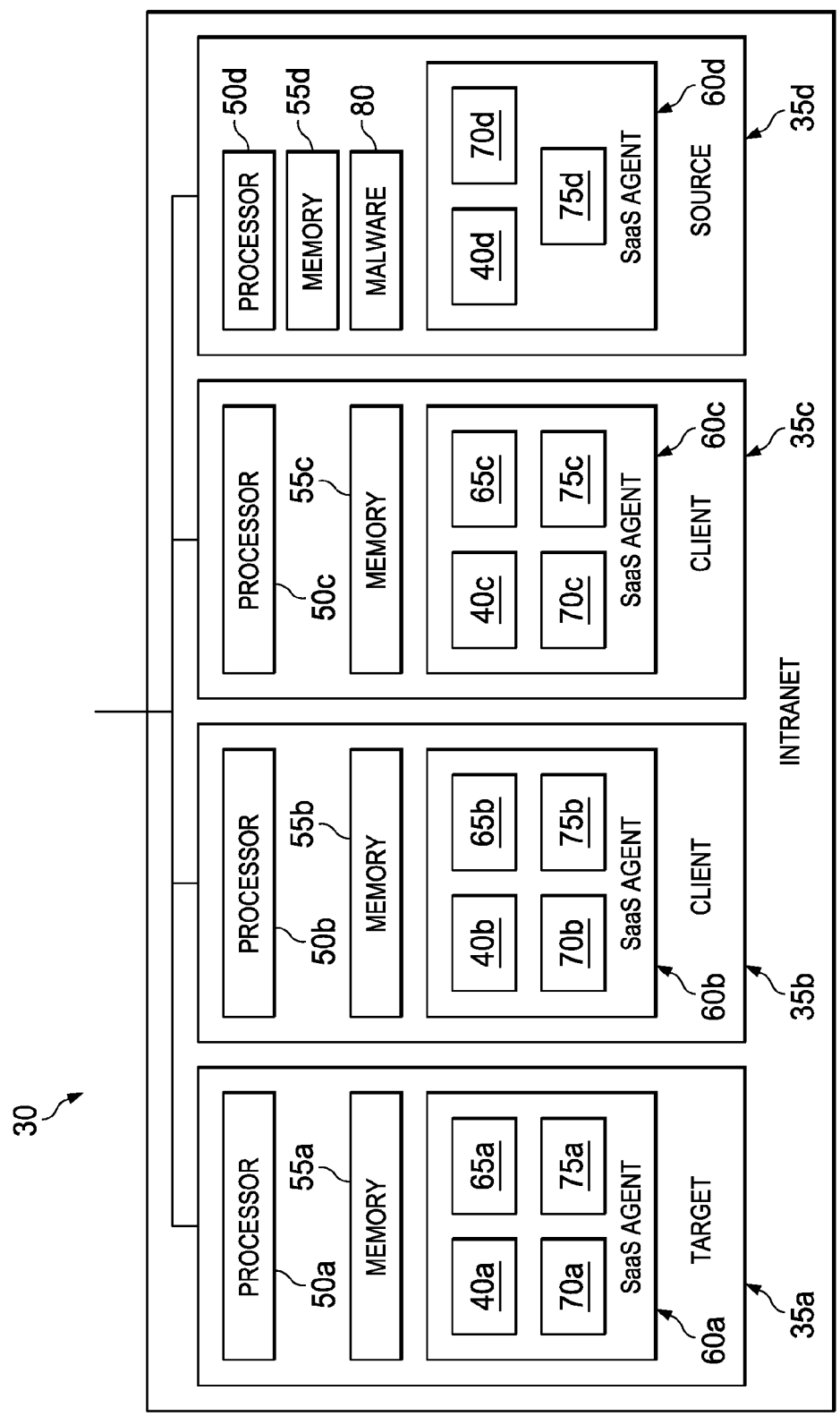
FIG. 2 is a simplified block diagram illustrating additional details that may be associated with example embodiments of clients in the network environment.

Turning to FIG. 2, FIG. 2 is a simplified block diagram illustrating additional details associated with potential embodiments of clients 35a-35d in network environment 10. Each of clients 35a-35d can communicate with each other over network connections in intranet 30, and may include a respective processor 50a-50d, a respective memory element 55a-55d, and various software elements. More particularly, clients 35a-35c may include an SaaS agent 60a-60c, respectively. SaaS agents 60a-60c may further include dynamic policy modules 40a-40c, an antivirus module 65a-65c, a local firewall module 70a-70c, and a rumoring module 75a-75c. Client 35d may also include an SaaS agent 60d with components similar to SaaS agents 60a-60c, but in this example embodiment SaaS agent 60d may include dynamic policy module 40d, a local firewall module 70d and a rumoring module 75d (without a corresponding antivirus module). Moreover, in this example embodiment, client 35d may also be infected with malware 80.

In one example implementation, clients 35a-35d are network elements, which are meant to encompass network appliances, servers, routers, switches, gateways, bridges, loadbalancers, firewalls, processors, modules, or any other suitable device, component, element, or object operable to exchange information in a network environment. Network elements may include any suitable hardware, software, components, modules, interfaces, or objects that facilitate the operations thereof. This may be inclusive of appropriate algorithms and communication protocols that allow for the effective exchange of data or information. Clients 35a-35d may also be representative of other wired or wireless network nodes, such as desktop computers, laptops, or mobile communication devices (e.g., an iPhone, iPad, Android device, etc.).

In regards to the internal structure associated with network environment 10, each of security center 15, network firewall 25, and clients 35a-35d can include memory elements (as shown in FIG. 2) for storing information to be used in the operations outlined herein. Additionally, each of these devices may include a processor that can execute software or an algorithm to perform activities as discussed herein. These devices may further keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory items discussed herein should be construed as being encompassed within the broad term 'memory element.' The information being tracked or sent by security center 15, network firewall 25, or clients 35a-35d could be provided in any database, register, control list, or storage structure, all of which can be referenced at any suitable timeframe. Any such storage options may be included within the broad term 'memory element' as used herein.

In one example implementation, security center 15, network firewall 25, and clients 35a-35d may include software (e.g., dynamic policy modules 40a-40d, etc.) to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Note that in certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements (as shown in FIG. 2) can store data used for the operations described herein. This includes the memory elements being able to store software, logic, code, or processor instructions that are executed to carry out the activities described herein. A processor can execute any type of instructions associated with the data to achieve the operations detailed herein. In one example, the processors (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.' Each of the network elements can also include suitable interfaces for receiving, transmitting, and/or otherwise communicating data or information in a network environment.

Figure 3:
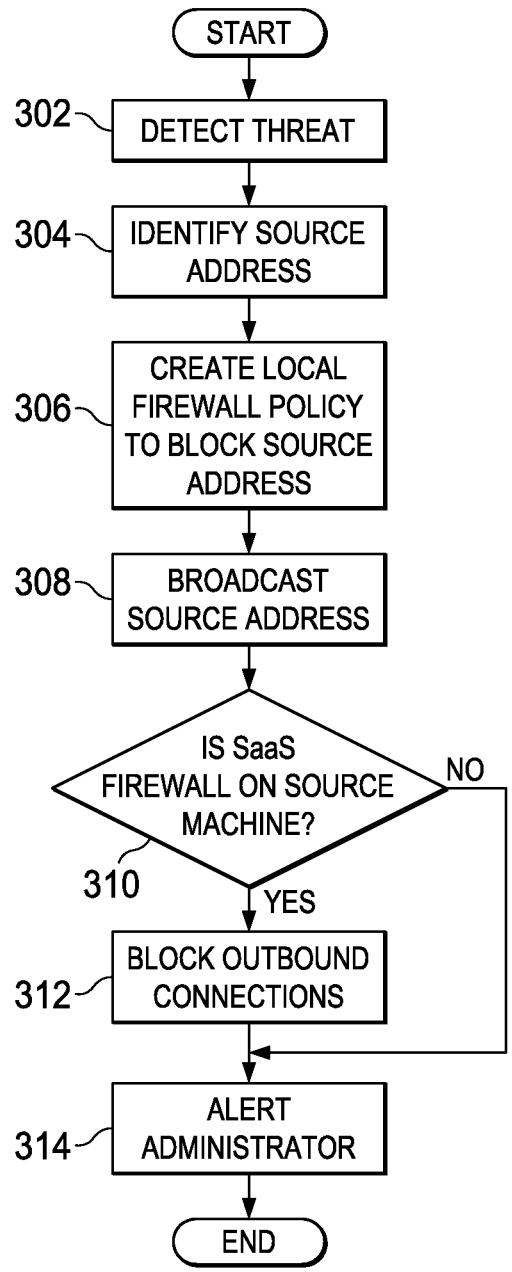
FIG. 3 is a simplified flowchart that illustrates potential operations that may be associated with an example embodiment of the network environment.

FIG. 3 is a simplified flowchart 300 illustrating potential operations that may be associated with one embodiment of network environment 10. In certain embodiments, such operations may be executed by SaaS agents 60a-60d (e.g., dynamic policy modules 40a-40d, etc.). At 302, a threat may be detected. A threat may be malware, but it may also include less nefarious threats, such as a user violating a system or network policy (intentional or unintentional). Thus, for example, in the example scenario in which malware 80 on client 35d ("source machine") is attempting to replicate to client 35a ("target machine"), then antivirus module 65a may detect the attempted replication.

At 304, an address associated with the source machine (e.g., an IP address) may be identified. Such identification may be provided by antivirus module 65a in SaaS agent 60a of client 35a, for example. A new local firewall policy may be created to block the source address at 306. For example, antivirus module 65a may provide the source address to firewall module 70a, which may then implement the local firewall policy.

The source address may be broadcast to other SaaS agents attached to the same network (i.e., intranet, subnet, etc.) at 308. Thus, if client 35a is a target machine (as in prior examples), then rumoring module 75a may broadcast the source address in a message to rumoring modules 75b-75c. In some embodiments, the message may include additional information, such as a firewall policy to apply. Consequently, other SaaS agents in the network may be informed that malware is attempting to crawl through the network, and the other agents may apply the new local firewall policy to block connections with the source machine.

At 310, it can be determined if an SaaS firewall module is available on the source machine (e.g., client 35d). If an SaaS firewall module is available (e.g., firewall module 70d), then outbound connections from the source machine (and possibly inbound connections to the source machine) may be blocked at 312. Additionally, an alert (e.g., an email message) may be sent to an administrator at 314. Such an alert may identify the source machine and provide remedial information to the administrator, such as an infection type, dynamic policies applied, and procedures for quarantining and cleaning the source machine.

Thus, network environment 10 may provide significant advantages, some of which have already been described. More particularly, network environment 10 may provide enhanced intelligence capability, being able to learn and manage itself, and may provide security not available in other SaaS platforms.

It is important to note that the steps in the appended diagrams illustrate only some of the possible scenarios and patterns that may be executed by, or within, the network environment. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
   detecting, at a first node having a security-as-a-service (SaaS) agent, a threat originating from a source node having a source address in a network, wherein the network includes at least the first node and a plurality of nodes each having a respective SaaS agent;
   applying a local firewall policy on the first node to block incoming connections associated with the source address;
   broadcasting, from the first node, an alert to the respective SaaS agents of the plurality of nodes in the network, wherein the broadcast alert comprises the source address of the source node from which the threat originated, wherein broadcasting the alert comprises broadcasting the local firewall policy;
   identifying, by the first node, a presence of an SaaS firewall module of the source node; and
   responsive to identifying the presence of the SaaS firewall module on the source node, communicating to the source node to apply a remote firewall policy to block outgoing connections from the source node to the plurality of nodes in the network.

2. The method of claim 1, further comprising alerting a network administrator.

3. The method of claim 1, wherein the threat is malware on the source node.

4. The method of claim 1, wherein the network is an intranet.

5. The method of claim 1, further comprising:
   alerting a network administrator;
   wherein broadcasting the alert comprises broadcasting the source address and instructions for applying the local firewall policy.

6. The method of claim 1, wherein the plurality of nodes of the network comprises an SaaS platform, wherein the SaaS platform includes a combination of at least one SaaS antivirus module and at least one SaaS firewall module in each node of the plurality of nodes.

7. Logic encoded in one or more non-transitory media that includes code for execution and when executed by one or more processors is operable to perform operations comprising:
   detecting, at a first node having a security-as-a-service (SaaS) agent, a threat originating from a source node having a source address in a network, wherein the network includes at least the first node and a plurality of nodes each having a respective SaaS agent;
   applying a local firewall policy on the first node to block incoming connections associated with the source address;
   broadcasting, from the first node, an alert to the respective SaaS agents of the plurality of nodes in the network, wherein the broadcast alert comprises the source address of the source node from which the threat originated, wherein broadcasting the alert comprises broadcasting the local firewall policy;
   identifying, by the first node, a presence of an SaaS firewall module of the source node; and
   responsive to identifying the presence of the SaaS firewall module on the source node, communicating to the source node to apply a remote firewall policy to block outgoing connections from the source node to the plurality of nodes in the network.

8. The encoded logic of claim 7, further comprising alerting a network administrator.

9. The encoded logic of claim 7, wherein the threat is malware on the source node.

10. The encoded logic of claim 7, wherein the plurality of nodes of the network comprises an SaaS platform, wherein the SaaS platform includes a combination of at least one SaaS antivirus module and at least one SaaS firewall module in each node of the plurality of nodes.

11. A first node, comprising:
    an antivirus module;
    a local firewall module;
    a dynamic policy module; and
    one or more processors operable to execute instructions associated with the antivirus module, the local firewall module, and the dynamic policy module such that the first node is configured for:
      detecting, at a first node having a security-as-a-service (SaaS) agent, a threat originating from a source node having a source address in a network, wherein the network includes at least the first node and a plurality of nodes each having a respective SaaS agent;
      applying a local firewall policy on the first node to block incoming connections associated with the source address;
      broadcasting, from the first node, an alert to the respective SaaS agents of the plurality of nodes in the network, wherein the broadcast alert comprises the source address of the source node from which the threat originated, wherein broadcasting the alert comprises broadcasting the local firewall policy;

identifying, by the first node, a presence of an SaaS firewall module of the source node; and responsive to identifying the presence of the SaaS firewall module on the source node, communicating to the source node to apply a remote firewall policy to block outgoing connections from the source node to the plurality of nodes in the network.

12. The first node of claim 11, further comprising alerting a network administrator.

13. The first node of claim 11, wherein the threat is malware on the source node.

14. The first node of claim 11, wherein the SaaS agent includes the antivirus module, the local firewall module, and the dynamic policy module.

* * * * *

UNITED STATES PATENT AND TRADEMARK OFFICE
CERTIFICATE OF CORRECTION

PATENT NO. : 8,881,258 B2  Page 1 of 1
APPLICATION NO. : 13/216516
DATED : November 4, 2014
INVENTOR(S) : Manabendra Paul et al.

It is certified that error appears in the above-identified patent and that said Letters Patent is hereby corrected as shown below:

In the Claims

In column 9, line 10, In Claim 13, delete "ma ware" and insert -- malware --, therefor.

Signed and Sealed this
Twenty-fourth Day of February, 2015

Michelle K. Lee
*Deputy Director of the United States Patent and Trademark Office*